US008379098B2

(12) United States Patent
Rottler et al.

(10) Patent No.: US 8,379,098 B2
(45) Date of Patent: Feb. 19, 2013

(54) REAL TIME VIDEO PROCESS CONTROL USING GESTURES

(75) Inventors: Benjamin A. Rottler, San Francisco, CA (US); Michael I. Ingrassia, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 12/764,360

(22) Filed: Apr. 21, 2010

(65) Prior Publication Data

US 2011/0261213 A1 Oct. 27, 2011

(51) Int. Cl.
*H04N 5/232* (2006.01)
(52) U.S. Cl. .................................. 348/211.6; 348/576
(58) Field of Classification Search ............... 348/211.6, 348/14.03, 576; 715/724
See application file for complete search history.

(56) References Cited

U.S. PATENT DOCUMENTS

| 6,901,561 | B1 * | 5/2005 | Kirkpatrick et al. .......... 715/863 |
| 7,444,068 | B2 | 10/2008 | Obrador |
| 2003/0001827 | A1 * | 1/2003 | Gould ............................ 345/204 |
| 2003/0025812 | A1 * | 2/2003 | Slatter ......................... 348/240.2 |
| 2006/0170791 | A1 * | 8/2006 | Porter et al. ................ 348/231.3 |
| 2009/0115863 | A1 | 5/2009 | Lee |
| 2009/0167890 | A1 * | 7/2009 | Nakagomi et al. .......... 348/222.1 |
| 2009/0256947 | A1 | 10/2009 | Ciurea et al. |
| 2010/0020222 | A1 * | 1/2010 | Jones et al. ............... 348/333.02 |
| 2010/0027845 | A1 | 2/2010 | Kim et al. |
| 2010/0141786 | A1 * | 6/2010 | Bigioi et al. ................ 348/222.1 |
| 2010/0141787 | A1 * | 6/2010 | Bigioi et al. ................ 348/222.1 |
| 2011/0090155 | A1 * | 4/2011 | Caskey et al. .................. 345/173 |
| 2011/0258537 | A1 * | 10/2011 | Rives et al. .................... 715/255 |
| 2012/0106790 | A1 * | 5/2012 | Sultana et al. ................. 382/103 |

* cited by examiner

*Primary Examiner* — Jason Chan
*Assistant Examiner* — Abdelaaziz Tissire
(74) *Attorney, Agent, or Firm* — Morgan, Lewis & Bockius LLP

(57) ABSTRACT

Method and apparatus of interaction with and control of a video capture device are described. In the described embodiments, video are presented at a display, the display having contact or proximity sensing capabilities. A gesture can be sensed at or near the display in accordance with the video presented on the display, the gesture being associated with a first video processing operation. The video are modified in accordance with the first video processing operation in real time.

11 Claims, 11 Drawing Sheets

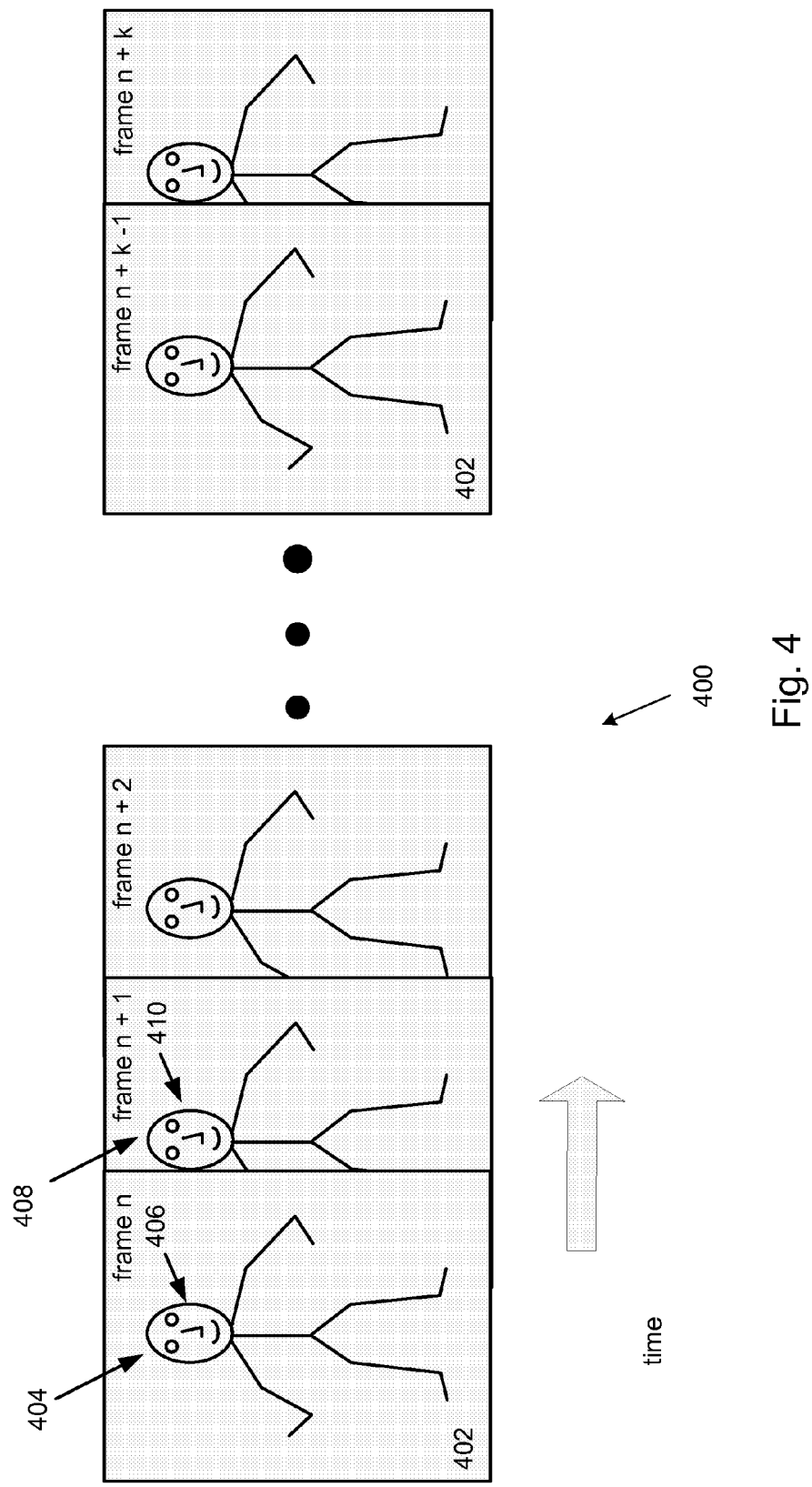

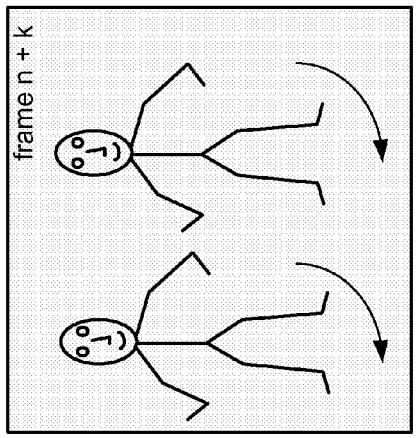
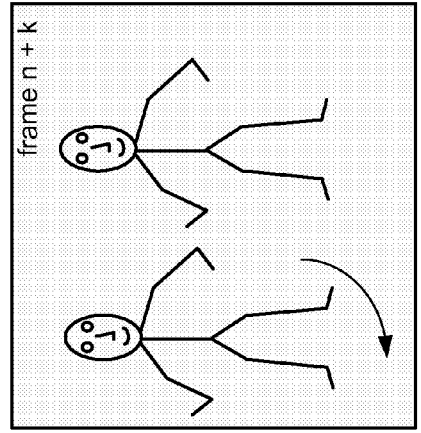
Fig. 5A
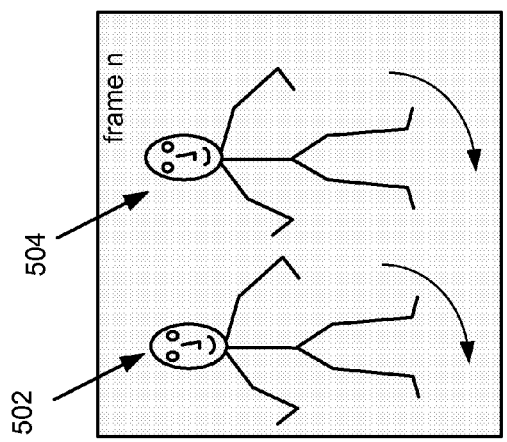
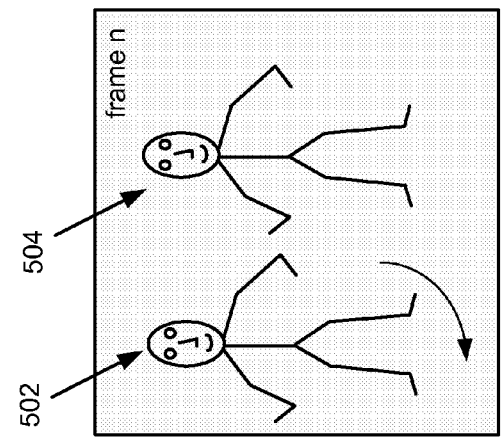
Fig. 5B
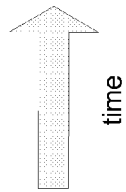

| GESTURE | TYPE | FUNCTION | Description |
|---|---|---|---|
| ↑ | SIMPLE | POINT TO OBJECT | Points to object image in video field |
| ○ ○ | SIMPLE | SELECT OBJECT | Selects (tags) object image in video field |
| \| | SIMPLE | ASSOCIATE OBJECT | Associate function links object images |
| A—B | COMPOUND | ASSOCIATE OBJECTS A AND B | Associates (links) object images A and B |
| F | SIMPLE | OBJECT RECOGNITION | Object recognition function |
| □ | SIMPLE | FIX ORIENTATION | Fix orientation of displayed video regardless of orientation of captured video |
| Ges~~tu~~re | COMPOUND | CANCEL GESTURE | Cancels operation of gesture |
| A∞B | SIMPLE | IMPLIED ASSOCIATE | Determines if there is an implied association between objects A and B |

Fig. 11

REAL TIME VIDEO PROCESS CONTROL USING GESTURES

TECHNICAL FIELD

The embodiments described herein relate generally to real time interactive control of image processing by a video capture device. More particularly, gestures can be applied in real time to initiate processing of video data by one or more video capture devices.

BACKGROUND

Small form factor video capture devices such as camcorders and video capable portable media players often utilize a touch-screen display to facilitate video image capture. Typically, a display portion of the touch screen is used for previewing video during or after playback of the recorded video. However, in order to process the video, the recorded video data must be ported to another device, such as for example, a host computer. Unfortunately, due to the portable nature of these devices, immediate access to a host computer can be difficult or impossible.

Therefore, there is a need to provide an efficient method and apparatus for using a small form factor video capture device to process video data in real time.

SUMMARY OF THE DESCRIBED EMBODIMENTS

It is an advantage of the presently described embodiments to provide real time interactive control of image processing performed by a video capture device.

In one embodiment, a method is described. The method can be carried out by performing at least the following operations. A digital video source provides an unprocessed digital video stream at least some of which is directly presented at a display in real time. A first gesture associated with a first video process is sensed. In response to the sensed gesture, at least a portion of the unprocessed digital video stream presented at the display is modified in real time in accordance with the first video process.

In one aspect, a second gesture associated with a second video process is sensed in conjunction with the first gesture. The first and second gestures are interpreted as a third gesture associated with a third video process used to modify the unprocessed digital video. For example, when the first gesture corresponds to a selection process for selecting an object image and the second gesture corresponds to an association process for associating at least two object images, the third video process is interpreted as associating the selected object images.

In another embodiment, a method for local control of video processing performed at a first remotely located video capture device is described. The method can be carried out by performing at least the following operations. At a local control device having a display, receiving in real time from the first remotely located video capture device, a first unprocessed digital video stream that is presented at the local display concurrent with the receiving. A first gesture associated with a first video process is sensed at the local control device. The local control device responds by generating and then sending a first instruction to the first remotely located video capture device. The first remotely located video capture device uses the first instruction to modify at least some of the first unprocessed digital video stream in real time in accordance with the first video process.

In yet another embodiment, a real time method for identifying an object image in a video formed of a plurality of video frames is described. The method can be carried out by performing at least the following operations. Receiving the video wherein at least some of the plurality of video frames includes object information corresponding to the object image. Using the object information from at least some of those video frames that include the object information to generate a correlation value. In the described embodiment, the correlation value indicates a degree of correlation between the object image and an object profile in a database of stored object profiles. The object image is identified by associating the object image with the stored object profile having the highest correlation value above a threshold correlation value.

In still another embodiment a method for associating at least a first and a second object image in a digital video formed of a plurality of digital video frames is described. The method can be performed by receiving at least some of the plurality of digital video frames at least some of which include object information corresponding to the first object image and the second object image. A correlation value between the first and second object images is determined. When the correlation value is greater than a threshold correlation value, the first and second object images are determined to be associated and the digital video is modified in accordance with the association.

In yet another embodiment, a video capture device is described. The video capture device includes at least a video source, a processor, and a display on which is presented in real time an unprocessed digital video stream received from the video source. The video capture device also includes a touch sensitive surface arranged to sense a gesture corresponding to a first video process. In response to the sensing of the gesture, the processor modifies the unprocessed digital video in real time in accordance with the first video process.

Other apparatuses, methods, features and advantages of the described embodiments will be or will become apparent to one with skill in the art upon examination of the following figures and detailed description. It is intended that all such additional systems, methods, features and advantages be included within this description be within the scope of and be protected by the accompanying claims.

BRIEF DESCRIPTION OF THE DUNPROCESSEDINGS

The described embodiments and the advantages thereof may best be understood by reference to the following description taken in conjunction with the accompanying drawings.

FIGS. 4 and 5A-5B show representative video data used by a recognition system in accordance with the described embodiments.

FIG. 11 shows various representative gestures and associated function descriptions in accordance with the described embodiments.

DETAILED DESCRIPTION OF REPRESENTATIVE EMBODIMENTS

Figure 1:
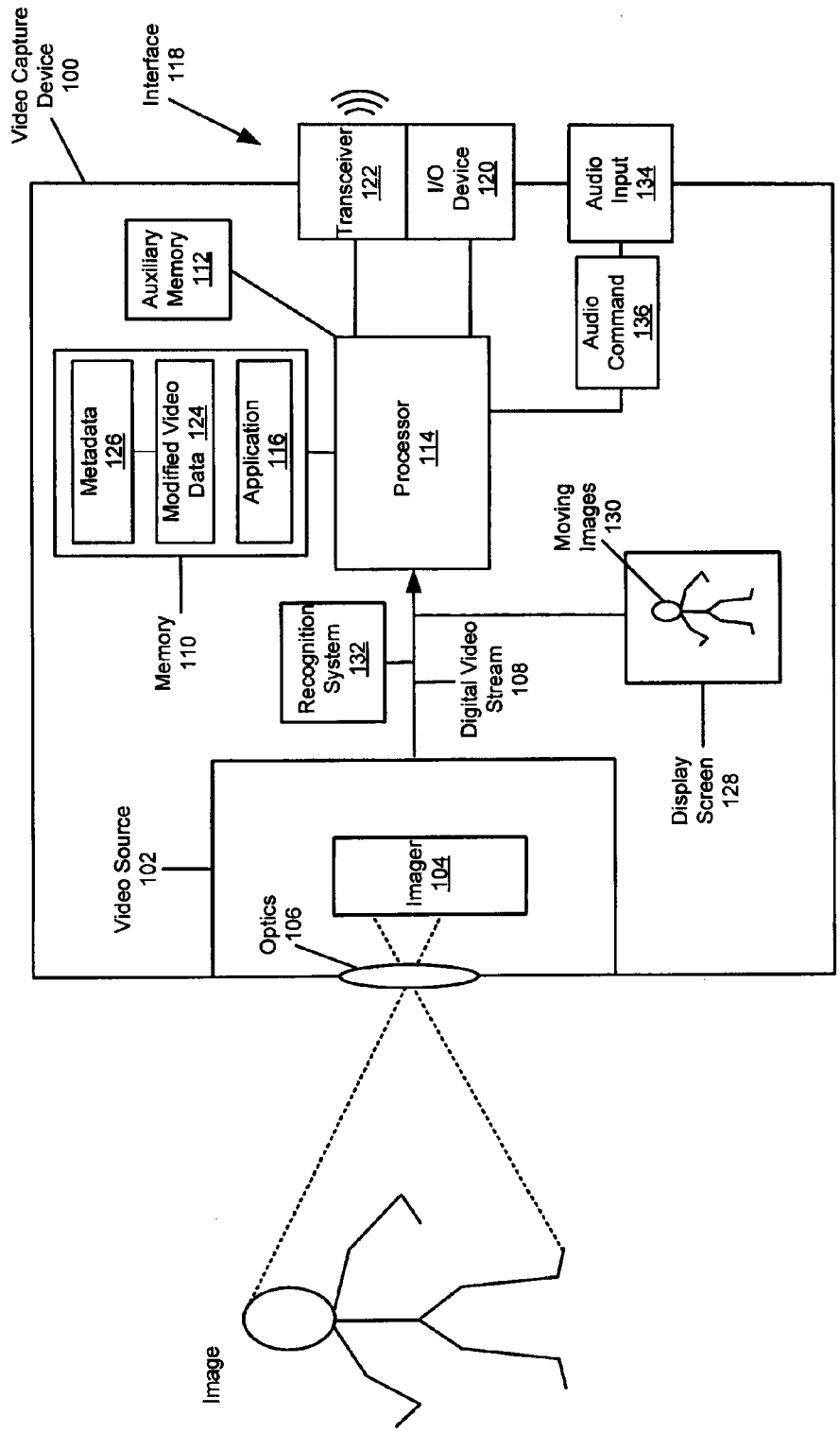
FIG. 1 illustrates video capture device in accordance with the described embodiments.

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

This paper describes real time control of video processing using a plurality of symbolic gestures. The plurality of symbolic gestures can be applied singly or in combination to control the processing in real time of video received at and by a video capture device. In the embodiments described herein the video capture device can be a stand-alone device such as a video camera. The video capture device can also be part of another device such as a portable media player having a camera suitably arranged to receive images that can be presented in real time as video on a display screen. In one embodiment, a touch sensitive input device can be used to sense gestures provided by an object (such as a user's finger or fingers in combination) in contact with or in proximity to the touch sensitive input device. In other cases, the touch sensitive input device can be incorporated into a display device. Still other embodiments describe hand gestures in either two or three dimensions that can be sensed by the video capture device using IR sensors, optical sensors, and so on. As with the touch based gestures applied on or near the touch sensitive input device, the hand gestures can be interpreted to provide instructions for real time processing of the video by the video capture device.

The gestures can be pre-defined by a gesture dictionary resident on a storage device included in or accessible to the video capture device. On the other hand, the gestures can be defined on an ad hoc basis (by a user, for example) in order to provide an active list of gestures that can be updated and otherwise modified as necessary or desired. In one embodiment, a gesture can be simply connected by which it is meant that the gesture can take the form of a continuous shape. In this way, the simply connected gesture can be formed without breaking contact with the touch sensitive surface thereby minimizing disruptive motions caused by repeatedly lifting and placing an object (such as a user's finger) onto the touch sensitive surface. Alternatively, non simply connected gestures that require repeatedly lifting and placing of the object onto the touch sensitive surface can disrupt the video capturing process when applied directly to the video capture device. For example, if the video capture device is lightweight or portable, placing and lifting a finger on a touch sensitive display can cause the video capture device to move resulting in spurious movements in the video. Non simply connected gestures can, however, be better suited for use with a control device, such as an iPhone™ or iPad™ manufactured by Apple Inc. of Cupertino Calif., configured to remotely control the video capture device. For example, if sufficient processing resources are available at the control device and the available bandwidth between the control device and video capture device is adequate, real time video received at the video capture device can be relayed directly to the control device for presentation on a control device display. In this way, non simply connected gestures applied to a touch sensitive surface at the control device display can be used to process the video received in real time from the video capture device without causing unwanted image movement or other motion induced artifacts.

In some cases, at least two gestures can be combined to form a compound gesture. For example, a first gesture associated with a first video processing operation can be combined with a second gesture associated with a second video processing operation. In this case, the first and second gestures can be interpreted by the video capture device (or control device) as a third gesture associated with a third video processing operation. The third video processing operation can be considered to be a combination of the first and the second video operations. For example, a first gesture can take the form of a selection gesture applied to an object or objects presented on the display screen. The selection gesture can correspond to a selection operation used to tag or otherwise identify the selected object(s), portions of displayed content, and so on for subsequent processing. For example, if a selection operation that tags objects (such as persons A and B) is combined with a second gesture corresponding to an association operation, then the combined gesture (selection and association) can be interpreted in such a way that persons A and B are henceforth associated with each other. Subsequently, the association can be deactivated by applying yet another gesture in the form of, for example, a deactivation gesture. In this way, at least for the duration of time that the association operation was active, persons A and B are tagged as being associated with each other in which case subsequent post processing can be used to identify all video data in which both persons A and B appear. In this way, a fast and efficient mechanism for identification and subsequent post processing of the associated image objects can be realized.

One of the features of the described embodiments provides for the flexible combination of various symbolic gestures. Much like letters in an alphabet, the basic gestures can be combined to form a script. The script can provide a list of instructions that can be interpreted to sequentially modify specific real time video operations. For example, a script can be formed of basic symbolic gestures combined to provide instructions that can be used to control both mechanical and real time video processing of an appropriately configured video capture device. For example, the script can call for a face recognition system to search incoming video for a specific individual. One such face recognition system is described in detail in U.S. patent application Ser. No. 12/436,069 entitled "Organizing Images by Correlating Faces" which is incorporated by reference in its entirety for all purposes. Once the specific individual is identified, the script can call for the video capture device to further process the video by zooming in (either digitally or by activating a mechanical zoom controller) and tracking the specific individual in real time. Still further, the script can call for the identification of a second individual that when identified can be associated with the previously identified individual. In this way, the symbolic gestures can be combined to form complex operational instructions that can be used by the video capture device or an associated remote device in communication therewith.

These and other embodiments are discussed below with reference to FIGS. 1-10. However, those skilled in the art will readily appreciate that the detailed description given herein with respect to these figures is for explanatory purposes only and should not be construed as limiting.

FIG. 1 illustrates video capture device 100 in accordance with the described embodiments. Video capture device 100 can include video source 102. Video source 102 can include imager 104 and optics 106. Imager 104 can convert analog visual information received by way of optics 106 into unprocessed digital video stream 108. In the described embodiment, unprocessed digital video stream 108 can be thought of as a stream of video unprocessed video data that can take the form of a substantially continuous stream of individual images (referred to as video frames or simply frames). The individual images when viewed in succession at what is referred to as a frame rate provide the illusion of motion. It should be noted that the minimum frame rate (the number of frames per unit of time of video) can be as low as 15 frames per second (fps). More typically, however, faster frame rates are used. For example, cinema is usually shot at 24 fps (progressive scan) whereas NTSC television is specified at 29.97 fps (progressive scan) or 60 fps interlaced. Digital video data 108 can take on any number of digital video formats such as serial digital, parallel digital, RGB, or consumer digital video that can be uncompressed or compressed using well known compression protocols (MPEG-2, MPEG-4, and so on). Digital video data 108 can also be any number and type of well known digital formats such as, SMPTE 274M-1995 (1920×1080 resolution, progressive or interlaced scan), SMPTE 296M-1997 (1280× 720 resolution) as well as standard 480 progressive scan video.

Video capture device 100 can include memory 110 and (optionally) auxiliary memory 112 (e.g., memory stick), each suitably arranged for storing processed video data and associated metadata (if any). Processor 114 can execute programmable instructions stored in memory 110 as application 116. Such instructions can be used to manipulate optics 106 into providing optical services such as zooming, focus control, and so on. Processor 114 can process video data 108 on the fly (i.e., in real time) in accordance with application 116 or by instructions received from interface 118. In the described embodiment, interface 118 can include touch I/O device 120 that can receive touch input for interacting with video capture device 100 via a wired or wireless communication channel and transceiver 122 arranged to establish a communication channel between video capture device 100 and an external circuit (not shown). Touch I/O device 120 can be used to provide user input to video capture device 100 in lieu of or in combination with other input devices. One or more touch I/O devices 120 can be used for providing user input to video capture device 100. Touch I/O device 120 can include a touch sensitive panel which is wholly or partially transparent, semi-transparent, non-transparent, opaque or any combination thereof. Touch I/O device 120 can be embodied as any multi-dimensional object having a touch sensitive surface for receiving touch input. In one example, touch I/O device 120 embodied as a touch screen can include a transparent and/or semitransparent touch sensitive panel partially or wholly positioned over at least a portion of a display. According to this embodiment, touch I/O device 120 functions to display graphical data transmitted from video capture device 100 (and/or another source) and also functions to receive user input. In other embodiments, touch I/O device 120 can be embodied as an integrated touch screen where touch sensitive components/devices are integral with display components/devices. In still other embodiments a touch screen can be used as a supplemental or additional display screen for displaying supplemental or the same graphical data as a primary display and to receive touch input.

Touch I/O device 120 can be configured to detect the location of one or more touches or near touches on device 120 based on capacitive, resistive, optical, acoustic, inductive, mechanical, chemical measurements, or any phenomena that can be measured with respect to the occurrences of the one or more touches or near touches in proximity to video capture device 100. Software, hardware, firmware or any combination thereof can be used to process the measurements of the detected touches to identify and track one or more gestures. The gestures can be associated with commands executed by processor 114 that can be used to process video data 108, manipulate optics 106 and so on. A gesture can correspond to stationary or non-stationary, single or multiple, touches or near touches on touch I/O device 120. A gesture can be performed by moving one or more fingers or other objects in a particular manner on touch I/O device 120 such as tapping, pressing, rocking, scrubbing, twisting, changing orientation, pressing with varying pressure and the like at essentially the same time, contiguously, or consecutively. A gesture can be characterized by, but is not limited to a pinching, sliding, swiping, rotating, flexing, dragging, or tapping motion between or with any other finger or fingers. A single gesture can be performed with one or more hands, by one or more users, or any combination thereof.

In some embodiments, the external circuit can be configured to act as a control device. If the processing resources of the control device are adequate, the video received in real time from video capture device 100 can also be processed in real time at and by the control device. In some embodiments, the processed video (and any metadata) can be relayed back to video capture device 100 for storage and/or further processing. In some cases, the video (and any metadata) processed at the control device can be stored in the control device. In this way, the control device can supplement the video processing and storage capabilities of video capture device 100. In addition to interacting with only video capture device 100, the control device can interact with a number of other remotely located video capture devices. The interaction between the control device and the various remotely located video capture devices can include directing movement of the video capture device itself (panning a scene, for example) as well as controlling optical services such as zoom and focus control at each of the video capture devices. For example, an operator using the external circuit as a control device can cause any of the remotely located video capture devices to pan and zoom in tandem or independently of each other. In addition to controlling the mechanical aspects of videographic process, the control device can also control various real time video processing operations at each of the remotely controlled video capture devices. In order to facilitate control of the various remotely located video capture devices, a portion of the control device display can be allocated as a control window for each of the remotely controlled video capture devices. In this way a user can easily control the operations of a wide variety of video capture devices.

Processor 114 can execute instructions in real time to modify video data 108 using any number of selected video processing operations to form modified video data 124. The instructions can be supplied locally at interface 118 or from the external circuit. In any case, when the instructions are executed by processor 114, the modified video data 124 can be stored in memory 110 or auxiliary memory 112. Modified video data 124 can be associated with metadata 126. Metadata 126 can be stored separately in memory 110 or auxiliary memory 112 separately or as part of modified video data 124. In any case, metadata 126 can be used to reconstruct the video data 108 (i.e., execute an "undo" operation) from the modified video data 124. Therefore, by using metadata 126, there is no need waste valuable memory resources by storing both modified video data 124 and unprocessed video data 108.

When the external circuit is configured to operate as the control device, the instructions remotely provided to video capture device 100 and executed by processor 114 can be based upon commands associated with gestures sensed at a gesture sensitive interface included in or associated with the control device. In this way, the real time modification of video data 108 can be controlled locally at video capture device 100 or remotely by the external circuit configured to operate as a control device or by video capture device 100 and the control device cooperating together. It should be noted in those situations where video capture device 100 is limited in memory capacity or processing capability or both, the external circuit can provide additional processing and or memory resources.

Video capture device 100 can include display screen 128 that can be used to present moving images 130 corresponding to video data 108. It should be noted that in the specific implementation discussed, the moving images presented on display screen 128 represent video received directly from video source 102 along the lines of a viewfinder and as such provides a real time display of images being received at imager 104. Display screen 128 can be coupled with touch I/O device 120 to form a touch screen used to sense a gesture that can be associated with video data processing instructions executed in real time by processor 114. Processor 114 can drive display 128 with graphical data to display a graphical user interface (GUI). The GUI can be configured to receive touch input via touch I/O device 120. Embodied as a touch screen, touch I/O device 120 can display the GUI. Alternatively, the GUI can be displayed on a display separate from touch I/O device 120. The GUI can include graphical elements displayed at particular locations within the interface. Graphical elements can include but are not limited to a variety of displayed virtual input devices including virtual scroll wheels, a virtual keyboard, virtual knobs, virtual buttons, any virtual UI, and the like. A user can perform gestures at one or more particular locations on touch I/O device 120 which can be associated with the graphical elements of the GUI. In other embodiments, the user can perform gestures at one or more locations that are independent of the locations of graphical elements of the GUI. Gestures performed on touch I/O device 120 can directly or indirectly manipulate, control, modify, move, actuate, initiate or generally affect graphical elements such as cursors, icons, media files, lists, text, all or portions of images, or the like within the GUI.

Gestures may also affect non-displayed GUI elements (e.g., causing user interfaces to appear) or may affect other actions within video capture device 100 (e.g., affect a state or mode of a GUI, application, or operating system). Gestures may or may not be performed on touch I/O device 120 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen. Feedback may be provided to the user in response to or based on the touch or near touches on touch I/O device 120. Feedback may be transmitted optically, mechanically, electrically, olfactory, acoustically, or the like or any combination thereof and in a variable or non-variable manner.

Correlation generally describes a broad class of statistical relationships between two or more observed objects or object images that can indicate a predictive relationship between the correlated objects or object images. A correlation coefficient can indicate a degree of relatedness between the observed objects or object images. Therefore, in order to infer a relationship between observed objects or object images in a video field, a correlation coefficient can be defined as simply a total number of video frames that include the observed objects or object images. If the total number of video frames that include the observed objects or object images is greater than a predetermined threshold value, then a reasonable correlation between the observed objects or object images can be inferred. Therefore, the implicit association attributed to the observed objects or object images can be used in post modification processing to identify those portions of a modified video in which the associated objects or object images are included.

Accordingly capture device 100 can include recognition system 132 arranged to recognize faces or objects by correlating the faces or objects represented in video data 108 to a known set of faces or objects. Recognition system 132 can be implemented in software executed by processor 114 or as a separate hardware component or as firmware. Recognition system 132 can access image data from video data 108 in the form of video frames each of which contains information that can be analyzed to determine, among other things, if a human face is represented in video data 108. Once it is determined with a pre-determined probability that a human face or faces is represented in video data 108, any video information corresponding to the face or faces can be correlated against a repository of information of known faces. A degree of correlation equal or greater than a threshold value can indicate that a match has occurred providing a possible identification of the individual whose face is represented in video data 108.

Video capture device 100 can use audio commands received from audio input 134 to actuate real time video processing. In this case, audio command 136 can be received at audio input 134. In the described embodiment, audio input 134 can forward audio command 136 to processor 114 that can convert audio command 136 into a recognizable instruction. It should be noted that in order to preserve the audio track of video data 108, audio command 136 can be received from an audio input device separate from that provided by video capture device 100. In some cases, however, if a separate audio input device is not available, than any spurious audio signals caused by audio command 136 on the sound track of video data 108 can be removed electronically using well known techniques of audio filtering.

Analysis of video data 108 can provide a basis for establishing an implicit association between individuals, between individuals and objects or between objects. By implicit association it is meant that whenever at least two entities correlate with each other (i.e., seen together, act in tandem, etc.), an association can be presumed. For example, two tennis players playing against each other can have a negative correlation (one is hitting the ball while the other is not) whereas those same players on the same doubles team can have a positive correlation. Therefore, by determining the relative correlation between these two players, an implicit association can be assigned to each. It should be noted that the large amount of information available in video data 108 can greatly improve both the efficiency and accuracy of recognition system 132.

For example, enhanced definition, uncompressed NTSC video 480P at 30 frames per second (referred to as 480p30) can provide 30 video frames per second each frame being a full image formed of approximately 640×480 pixels (short term for picture elements).

Figure 2:
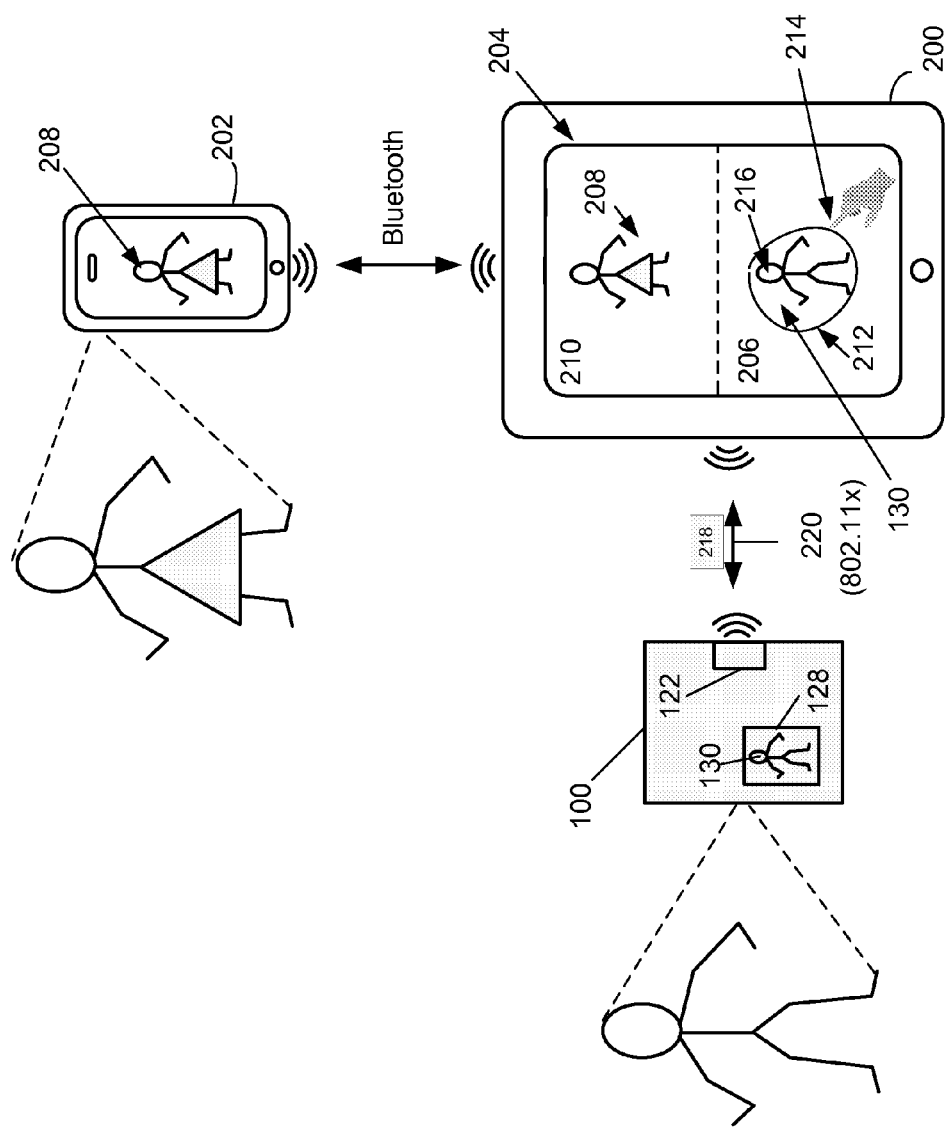
FIG. 2 shows an external circuit used as control device used for real time control of video processing carried out by various video capture devices.

FIG. 2 shows the external circuit used as control device 200 to control (at least in part) real time video processing conducted by remotely located video capture devices in accordance with the described embodiments. Control device 200 can be configured to wirelessly (or by way of a cable) communicate with any number of remotely located video capture devices and in so doing provide real time video processing commands. Control device 200 can take many forms not the least of which is a tablet computer along the lines if the iPad™ tablet computer manufactured by Apple Inc. of Cupertino, Calif. Control device 200 can wirelessly communicate with any number and variety of remotely located video capture devices using different wireless communication protocols. For example, control device 200 can wirelessly communicate with video capture device 100 by way of wireless transceiver 122 using, for example, an 802.11x (WiFi) communication protocol. At the same time, control device 200 can wirelessly communicate with stand alone mobile wireless communication device 202. Mobile wireless communication device 202 can take the form of a portable media player such as an iPod Touch™ or a Smartphone such as an iPhone™ each manufactured by Apple Inc of Cupertino, Calif. In any case, device 202 can wirelessly communicate with control device 200 using any appropriate wireless protocol such as the Bluetooth (BT) wireless communication protocol. Using a wireless communication channel, video capture device 100 can transmit images 130 in real time to control device 200 concurrently with displaying images 130 on display 128. Images 130 can, in turn, be displayed in a portion of display 204 of control device 200 using control window 206 to distinguish from other images received from other video capture devices. For example, mobile wireless communication device 202 can transmit images 208 in real time to control device 200 concurrently with presenting images 208 on display 204 using control window 210 to distinguish from images 130 presented in control window 206.

Display 204 can also present a graphical user interface (GUI) configured to receive touch input along the lines discussed above with regards to display 128 and touch I/O device 120. As above, a user can perform gestures at one or more particular locations on display 204 which may be associated with the graphical elements of the GUI. In other embodiments, gestures can be performed at one or more locations that are independent of the locations of graphical elements of the GUI. Gestures performed on display 204 may directly or indirectly manipulate, control, modify, move, actuate, initiate or generally affect graphical elements such as cursors, icons, media files, lists, text, all or portions of images, or the like within the GUI.

When associated with touch I/O device 120, display 204 can sense gestures applied on or near the surface of display 204. Gestures, in general, can take many forms. For example, a gesture can take the form of a geometric pattern (e.g., half-circle, circle, square, triangle, etc.), a symbol (e.g., check mark, question mark, simple arrow with any shaped terminator, caret, etc.), letters, predetermined patterns, user programmed patterns, and combinations thereof. When a gesture is applied to display 204, control device 200 can automatically determine a boundary corresponding to the selection indicated by a gesture using positional data corresponding to the contours of the gesture on or near the surface of display 204. In a particular implementation, that portion of image 130 included within the boundary can be annotated by, for example, displaying a highlighting halo or other such indicia. It should be noted that in some embodiments a prompt can be used to initiate any actions corresponding to an applied gesture. In this way, a gesture even though applied can be corrected or otherwise refined.

In accordance with the described embodiments, real time video processing of video data 108 can be controlled by applying an appropriate gesture at display 204 within the boundaries of control window 206 (or by applying gestures on or near display 128 or display 206). For example, gesture 212 can be created by applying an object such as finger 214 on or near the surface of display 204. In this example, gesture 212 can take the form of a closed loop that encloses an object. In this case, gesture 212 can enclose a portion of images 130 such as, for example, face 216. In this way, processor 114 in video capture device 100 can process face 216 in real time in accordance with instructions corresponding to gesture 212. For example, if gesture 212 corresponds to a select function that tags or otherwise identifies the content enclosed within the boundary defined by gesture 212, then processor 114 will tag or otherwise identify face 216. This tagging can be particularly useful when used in conjunction with a mechanism for facial recognition used to identify individuals based upon specific facial characteristics.

Gesture 212 can be sensed by display 204. Gesture 212 can correspond to a particular video processing operation that can be carried out by processor 114 in real time. Therefore, once gesture 212 is sensed by control device 200, processing command 216 can be forwarded by way of bi-directional wireless communication channel 218 to processor 114 by way of wireless interface 122. In this way, processor 114 can operate on digital video data 108 in real time in accordance with the instructions corresponding to gesture 212. In some cases, processor 114 may not have sufficient processing resources available to carry out the processing of digital video data 108 called for by the received instructions. In this case, control device 200 can assist processor 114 by processing video data 108 received at control device 200. The processed video data can then be sent back to video capture device 100 for presentation at display 128. For example, if gesture 212 corresponds to a select function, then control device 200 can provide instructions to processor 114 to select image 130 (or portions thereof) included within the boundary of gesture 212. Once the select instruction is received, processor 114 can tag or otherwise annotate image 130 in accordance with the select instruction. It should be noted, that as with video capture device 100, any processing carried out by control device 200 is contemporaneous with the presentation of images on display 204. In this way, display 204 (as with display 128) can display images real time as relayed directly from video capture device 100 by way of wireless interface 122.

Figure 3:
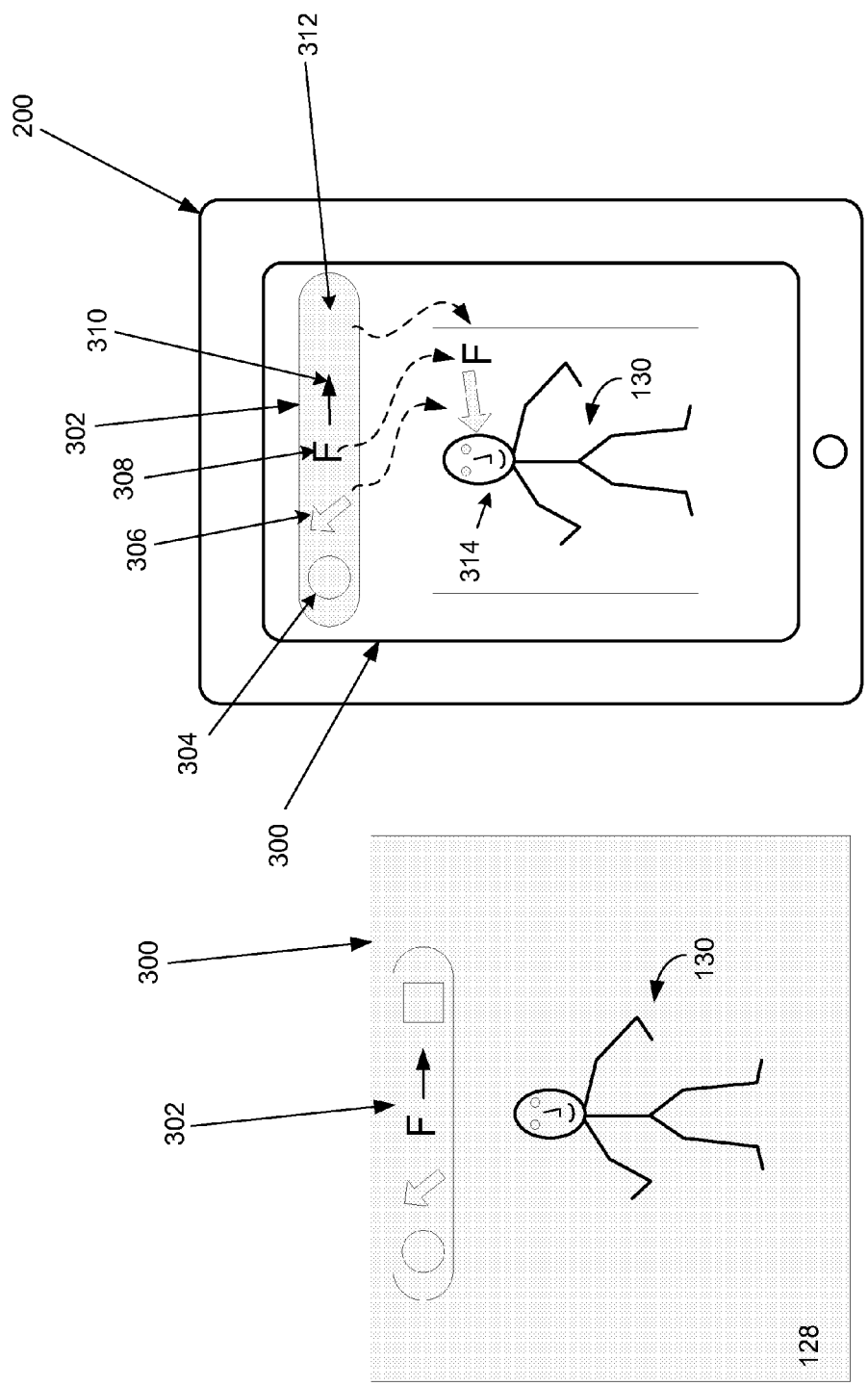
FIG. 3 shows a representative menu used for providing a plurality of pre-defined gestures each corresponding to a particular video processing operation in accordance with the described embodiments.

FIG. 3 shows representative GUI 300 for presentation on display 204. GUI 300 can include menu 302 that can presents a number of pre-defined gestures. Menu 302 can be presented by any of the displays 128, 204, or 208 concurrently or independently of each other. For example, display 128 and display 304 can each present menu 302, or its equivalent. Menu 302 can include a number of pre-defined gestures as well as gestures defined in a more ad hoc basis. In any case, representative menu 302 can include at least selection gesture 304, pointing gesture 306 used to point to a specific portion of image 130, facial recognition gesture 308 used to activate a facial recognition application, associating gesture 310 used to associate one or more objects and orientation fixing gesture 312 used to fix an orientation of an object or objects regardless of the orientation of video capture device 100. In some modes, additional gestures can be added from an internal dictionary on an ad hoc basis whereas in other modes, new gestures can be created and associated with a particular video processing operation or operations.

By using various gestures in combination, complex operations can be performed using nothing more than simple geometric shapes, figures, lines, etc. For example, pointing gesture 306 can be chosen, a copy of which can then appear on display 204 and dragged to a position aligned with face 314 of image 130. In this way, pointing gesture 306 indicates that face 314 of image 130 is designated as a particular region of interest. Facial recognition gesture 308 can be used to notify processor 114 to identify (if possible) face 314 using any available facial characteristics data stored in memory 110 or available in video data 108. Moreover, orientation fixing gesture 312 can be used to fix the orientation of the portion of image 130 within the boundary of orientation fixing gesture 312. In this way, regardless of the orientation of video capture device 100, image 130 will always be presented in the orientation corresponding to that presented by display 204. In other words, video data 108 will be processed in such a way that moving images corresponding to modified video data 124 will be presented in the same orientation (either landscape or portrait) regardless of the orientation of video capture device 100 at the origination of video data 108.

FIG. 11 illustrates various representative gestures and associated function descriptions in accordance with the described embodiments. As shown in FIG. 11, a number of gestures can be used to instantiate any number of associated video processing operations. FIG. 11 can represent in tabular form a gesture dictionary or listing stored in or otherwise available to video capture device 100 or control device 200. In addition, gestures can be predefined using, for example, established icons graphically presented in a graphical user interface such as GUI 300 or in menu 302. In addition to using established icons, FIG. 11 illustrates touch generated gestures corresponding to some of the established gestures. For example, the pointing gesture can be presented as an icon or an ad hoc gesture created using a finger or other object applied to touch I/O device 120.

The ability to use video data to facilitate facial recognition as well as to determine an association between objects (including between individuals and between objects and individuals) can be provided by the embodiments described herein. With regards to recognition system 132, video data is formed of a number of still images (frames) each of which includes visual information. The visual information can include facial characteristics used to identify a face presented in video data 108. The visual information can also relate to an image of an object or objects that can be related to each other or in some cases individuals presented in the video. Since each video frame is essentially a full image, each image can be used to provide information that can be used by recognition system 132. For example, recognition system 132 can review a number of the video frames in video data 108 for facial characteristics data. The facial characteristics data can be compared to facial characteristics data of known faces. If there is a high correlation between at least one of the known faces and the face presented in video data 108, then a prompt can be posted indicating that the identity of the face presented in video data 108 has been found. In some cases, a request to confirm the suggested identity can be posted on display 128. If the identity is correct, then an approval gesture can be applied, otherwise, a suggested identity can be entered in which case, further facial recognition processing can commence.

In addition to providing more efficient and accurate facial recognition services, recognition system 132 can use video data 108 to determine if there is an implied association between various images presented in video data 108. Implied association, unlike the explicit association described above, can be construed as a relationship between at least two entities that is presumed based upon extrinsic factors such as duration of proximity to each other, the actual proximity and the amount of time in actual proximity to each other, correlated actions made by or between the objects (if at least one of the objects is an animate object) and so on. For example, if two individuals are identified from the video data and it is determined that the two individuals are associated with each other for at least a pre-determined number of consecutive, or nearly consecutive, video frames, then an implicit association can be assigned to the two individuals.

More specifically, FIG. 4 shows representative video data 400 in accordance with the described embodiments. It should be noted that video data 400 can be uncompressed video data or compressed video data along the lines of MPEG-2 or MPEG-4 without loss of generality. Assuming for the moment that video data 400 is uncompressed, video data 400 can include plurality of video frames 402 temporally ordered from left to right starting at frame $F_r$, and extending to frame $F_{n+k}$. For example, presuming that video data 400 is enhanced definition, uncompressed NTSC video 480P at 30 frames per second (480p30), as many as 30 video frames per second can be analyzed. By taking advantage of this information, recognition system 132 can provide an efficient and accurate facial recognition service. Allowing for sufficient processing speed and resources, processor 114 can review each of plurality of video frames 402 and identify facial characteristics associated with an individual presented in each frame. For example, frame $F_n$, can present individual 404 having corresponding facial features 406, frame $F_{n+1}$ can present individual 408 (which may be the same as individual 404) having corresponding facial features 410, and so on for however many frames are deemed appropriate.

For each frame reviewed, processor 114 can correlate and compare the facial features with each other to ascertain whether or not individual 404 is the same as individual 408 and so on. In the situation where processor 114 has determined that individuals 404 and 408 are likely the same, then processor 114 can attempt to identify individual 404 using various facial recognition techniques such as those described above. In some cases, it is not necessary to review every video frame. For example, if there is most likely only a few or even only one or two individuals being presented in each frame, than a number of frames can be skipped since it is unlikely that the identities of the individuals being presented is going to change in the time between frames (which can be on the order of 15 msec). In some embodiments, if it is determined that digital video data 400 is compressed using, for example, MPEG compression techniques, then only I frames can be used since I frames include most of the video information available (P and B frames being essentially estimates of motion between corresponding I frames).

Using the data available in video data 400 can also be used to imply associations between people and between people and objects. For example, as shown in FIG. 5A, if it is determined that individual 502 and 504 appear together in the same video frame, then a determination can be made if individuals 502 and 504 have motion that has a high correlation with each other (either negatively or positively) in more than a pre-determined number of video frames. In this way, an association between individual 502 and 504 can be implied. Using the example above, if as shown in FIG. 5A, individuals 502 and 504 are dancing together, and then there is likely a high positive correlation between the motions exhibited by individuals 502 and 504. In this way, the individuals 502 and 504 can be automatically associated with each other. On the other hand, if as shown in FIG. 5B, there is no (or less than a pre-determined degree) of correlation between individuals 502 and 504, then no association can be ascribed. In some cases, the association (or lack thereof) between individuals 502 and 504 can be put in abeyance or otherwise modified if directed by processor 114 based upon instructions from a user received by way of interface 120.

Figure 6:
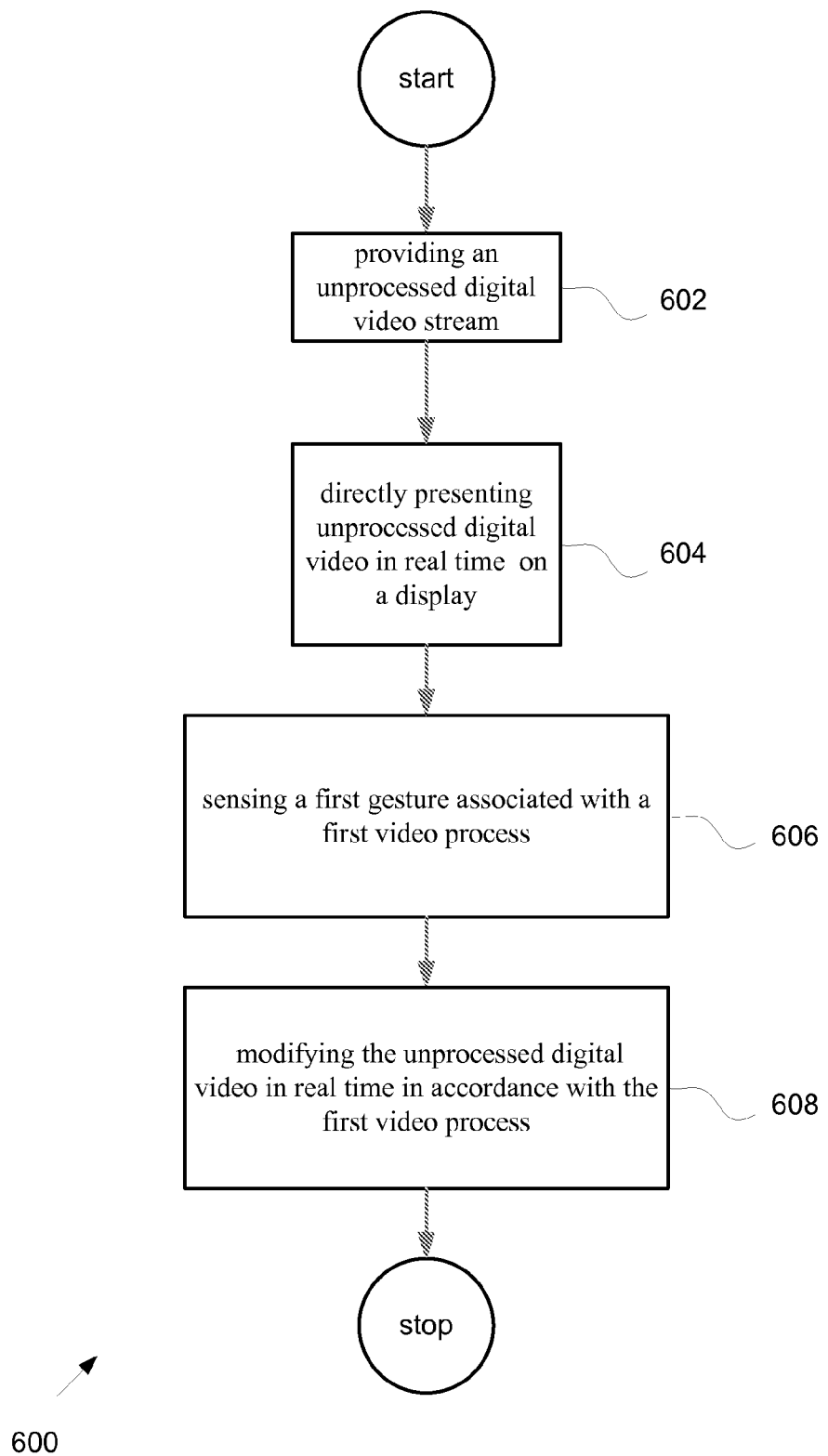
FIG. 6 shows a flowchart detailing a process for gesture control of video processing in real time.

FIG. 6 shows a flowchart detailing process 600 for gesture control of video processing in real time. Process 600 can be performed by a video capture device having at least a video source having optics and an imager, a processor, and a display arranged to facilitate sensing gesture based inputs. The video capture device can be a stand-alone device, such as a video camera. The video capture device can also be part of another device such as a portable media player having a camera suitably arranged to receive images that can be presented in real time as video on the display screen. In one embodiment, a touch sensitive input device can be incorporated into the display screen and be used to sense gestures provided by an object (such as a user's finger or fingers in combination) in contact with or in proximity to the display screen. Accordingly, process 600 can begin at 602 by providing unprocessed digital video stream by a video source. At 604, at least a portion of the unprocessed digital video stream is directly presented in real time at a display. By directly presented it is meant that images are presented at the display directly from the video source. By unprocessed digital video it is meant that the images presented at the display remain essentially unchanged from those received at an imager used by the video capture device to convert light into digital video data.

At 606, a first gesture can be sensed at the display or at a gesture sensitive interface in cooperation with the display in accordance with the presented video. In the described embodiment, the first gesture can associated with a first video processing performed by the processor. It should be noted that gestures, in general, can take many forms. For example, a gesture can take the form of a geometric pattern (e.g., half-circle, circle, square, triangle, etc.), a symbol (e.g., check mark, question mark, simple arrow with any shaped terminator, caret, etc.), letters, predetermined patterns, user programmed patterns, and combinations thereof. At 608, the processor can modify the video in real time by performing the first video processing on the video. For example, if the first gesture is associated with a selection processing, then those portions of the video presented on the display that are within a boundary defined by the first gesture can be tagged or otherwise identified as being selected by the processor performing the selection processing as indicated by the first gesture.

Figure 7:
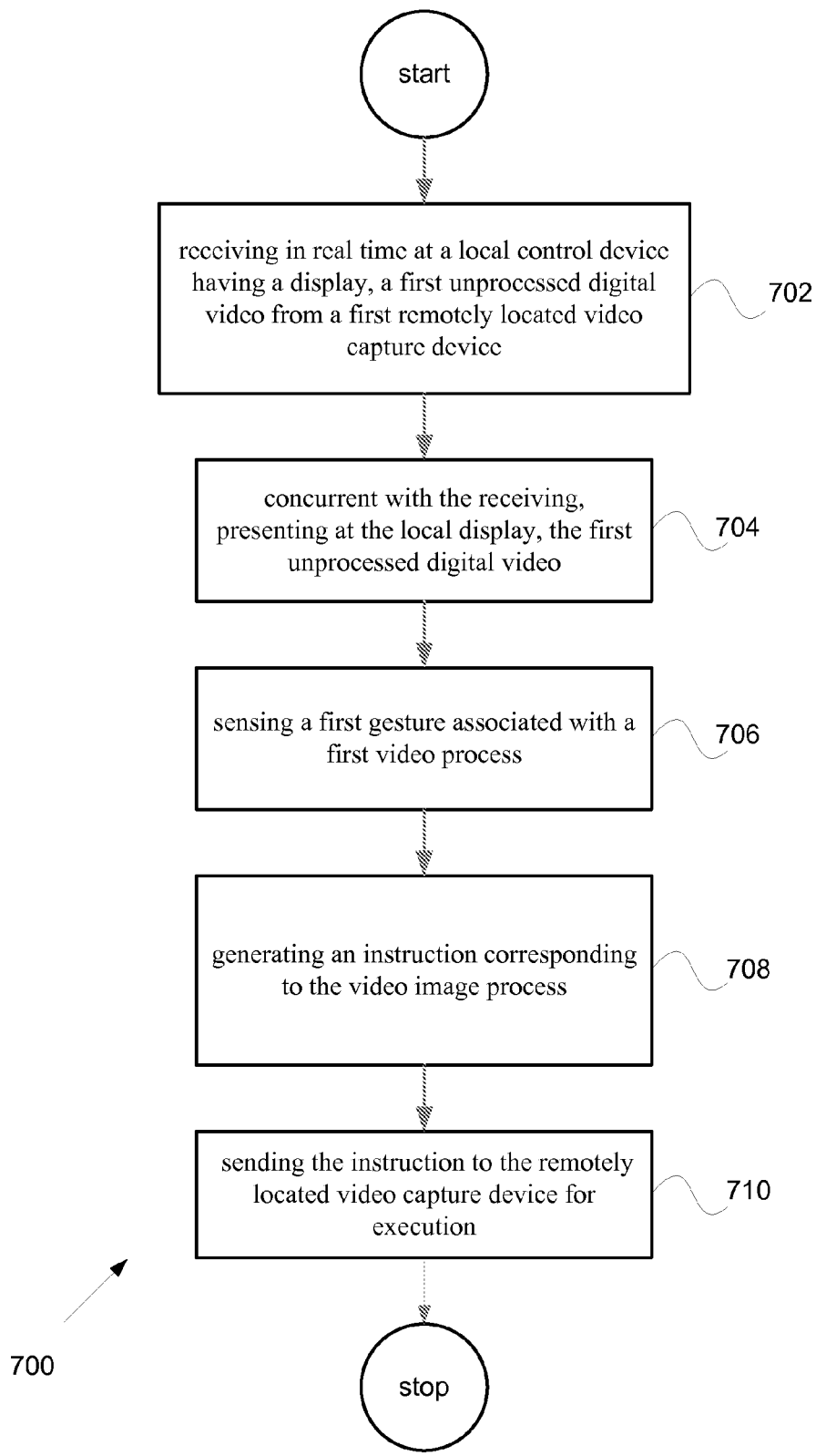
FIG. 7 shows a flowchart detailing a process for using gestures at a remote control to control local video processing in real time.

FIG. 7 shows a flowchart detailing process 700 for independently controlling image processing at remotely located video capture devices using gestures sensed at a local display. In the described embodiment, the remotely located video capture device can be a portable media player equipped with a video camera. The remotely located video capture device can also be a standalone video capture device such as a video camcorder. In any case, process 700 can begin at 702 by receiving in real time at a local control device having a display, a first unprocessed digital video from a first remotely located video capture device. The video can be received over a wireless communication channel or over a wired communication channel. At 704, concurrent with the receiving, presenting at the local display the first unprocessed digital video.

At 706, a first gesture associated with a first video process is sensed in accordance with the presented first unprocessed digital video. In one embodiment, the sensing can be touch based carried out by a touch sensitive surface incorporated within the local display or as a separate touch sensitive device. At 708, an instruction corresponding to the video process can be generated at the local control device and sent at 710 to the remotely located video capture device for execution.

Figure 8:
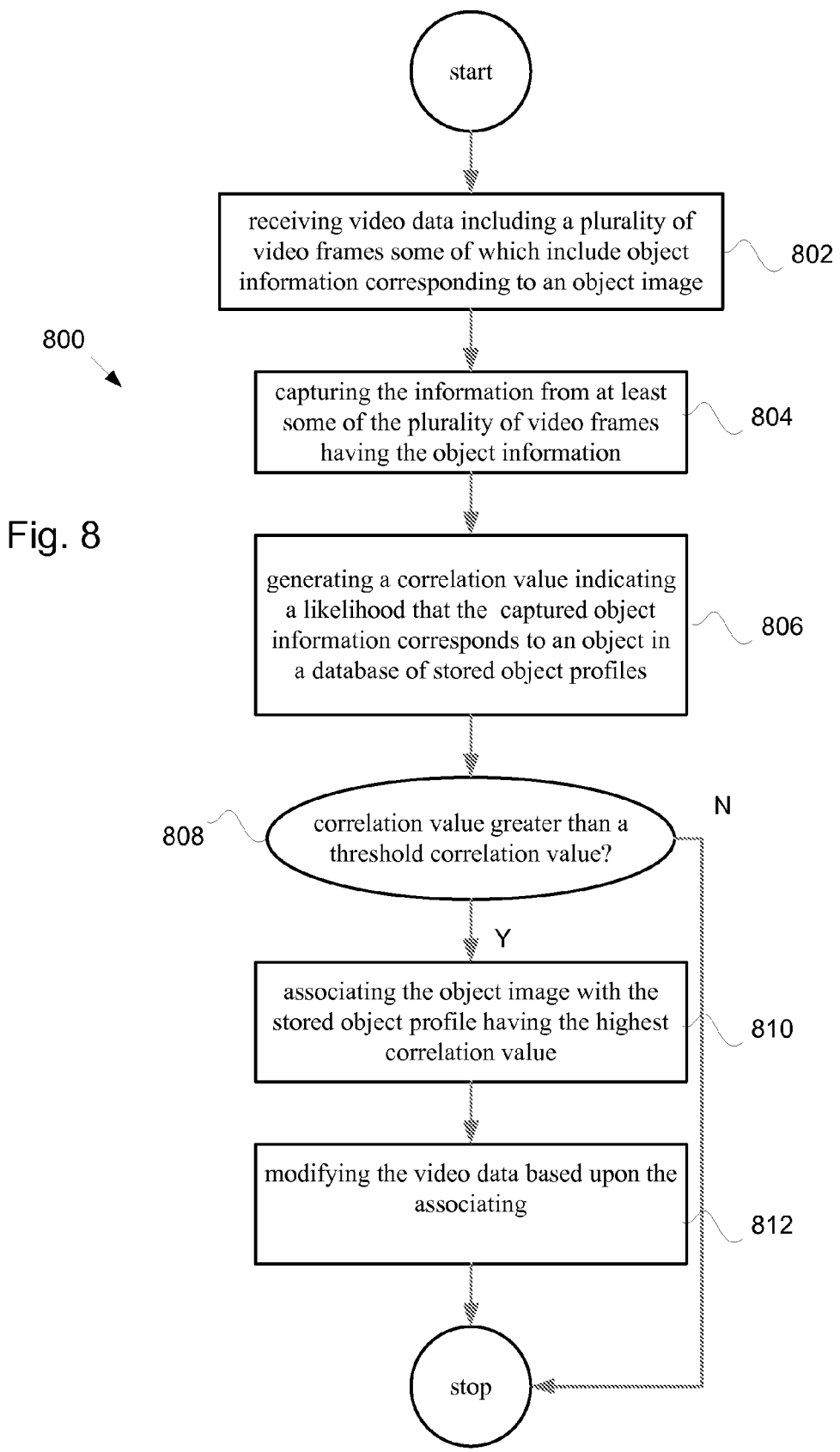
FIG. 8 shows a flowchart detailing a process for recognizing an object presented in a video field in accordance with the described embodiments.

FIG. 8 shows a flowchart detailing process 800 for using video data to recognize an object presented in a video field in accordance with the described embodiments. Process 800 can begin at 802 by receiving video data that includes a plurality of video frames some of which include object information corresponding to an object image. At 804, information from at least some of the plurality of video frames having the object information is captured. At 806, a correlation value can be generated. The correlation value can indicate that the captured object information corresponds to an object in a database of stored object files. Next, at 808, a determination is made whether or not the correlation value is greater than a threshold correlation value. If it is determined that the correlation value is not greater than the threshold correlation value, then process 800 ends, otherwise control is passed to 810 where the object image is associated with the store object profile having the highest correlation value. At 812, the video data is modified to reflect the association. For example, if the object image is a human face, then the object profile having the highest correlation to the human face can be used to identity of the human associated with the face.

Figure 9:
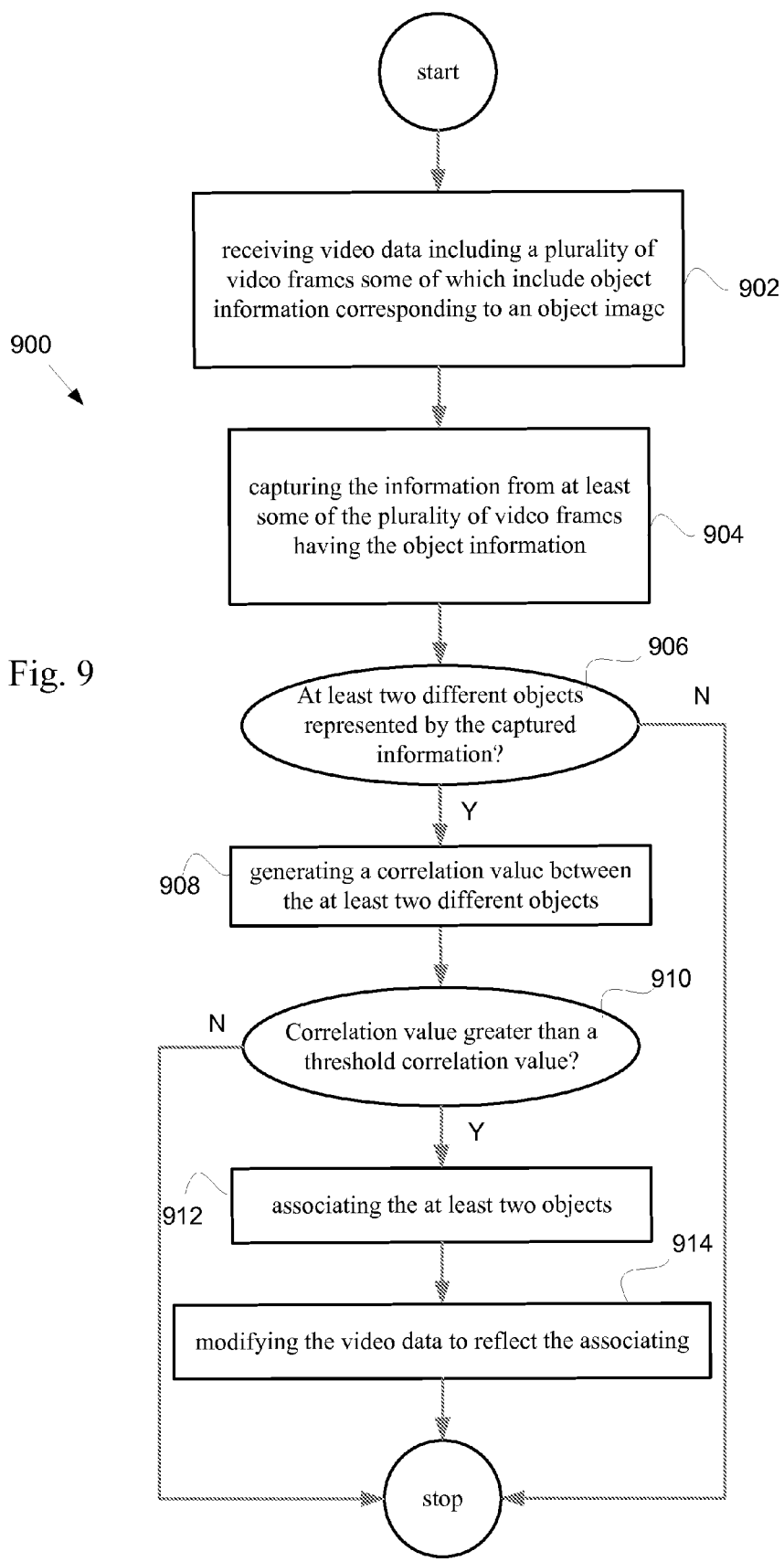
FIG. 9 shows a flowchart detailing a process for determining a degree of correlation between at least two different objects in a video field in accordance with the described embodiments.

FIG. 9 shows a flowchart detailing process 900 for determining a degree of correlation between at least two different objects in a video field in accordance with the described embodiments. Process 900 can begin at 902 by receiving video data. The video data can include a plurality of video frames some of which can include object information corresponding to an object image. At 904, information from at least some of the plurality of video frames having the object information can be captured. At 906, a determination is made if there are at least two different objects represented by the captured object information. If it is determined that there are not at least two different objects represented by the captured object information, the process 900 ends, otherwise, control is passed to 908 where a correlation value indicating a degree of correlation between the at least two different objects is generated. At 910, a determination is made if the correlation value is greater than a threshold correlation value. If it is determined that the correlation value is not greater than the threshold correlation value, the process 900 ends, otherwise control is passed to 912, where the at least two different objects are associated. At 914, the video data is modified to reflect the association.

Figure 10:
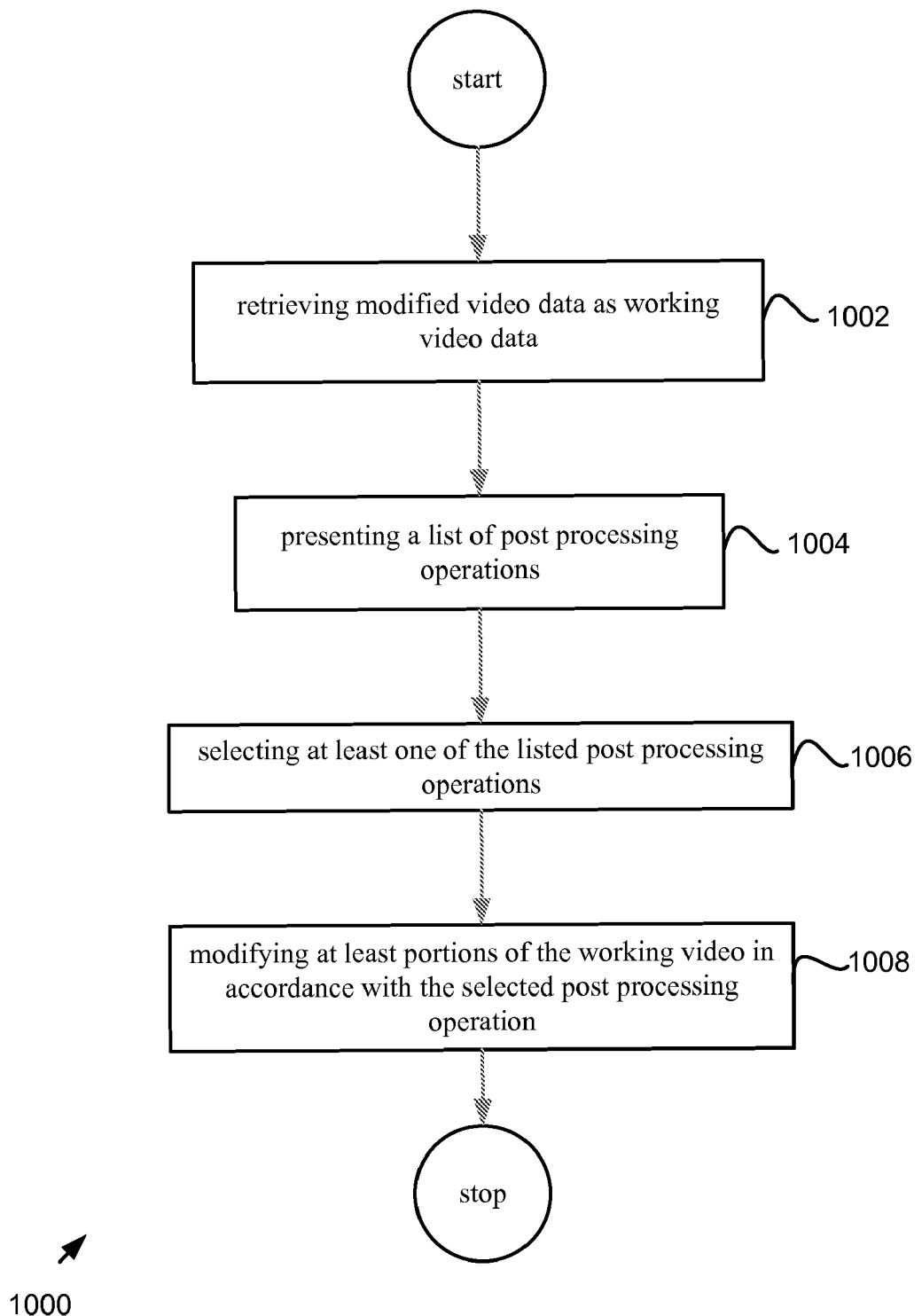
FIG. 10 shows a flow chart detailing process for post processing of modified video data in accordance with the described embodiments.

Associating image objects (be it explicitly or implicitly) can provide substantial advantages in post processing of modified video data 124. For example, FIG. 10 shows a flow chart detailing process 1000 for post processing of modified video data in accordance with the described embodiments. It should be noted that modified video data 124 can be stored in any number of memory devices located either locally at video capture device 100 or remotely at control device 200 or at a server computer made accessible through a network such as that represented by the Internet. In any case, process 1000 can begin at 1002 by retrieving modified video data as working video data. The working video data can include the modified video and corresponding metadata. In some cases, it may not be efficient or feasible due to bandwidth constraints or other considerations to transfer a large amount of video data over a network or even between local computers. In this case, retrieving 1002 can result in only the metadata when the metadata includes video edits corresponding to the modifications performed on (unprocessed) video data 108. At 1004, a list of post processing operations can be presented. The list of post processing operations can include, for example, a list of associated image objects, a list of recognized faces, and so on. At 1006, at least one of the listed post processing operations can be selected. For example, if a user wishes to gather all video from the working video that presents a particular recognized individual, then the user can select an icon, for example, indicating that all video data having the recognized individual to be retrieved for subsequent processing. Alternatively, the user can view all video data from the working video that presents people, for example that have been associated with each other either expressly or impliedly. In this way, video data presenting those people (or objects, or people and objects) considered to be associated with each other can be retrieved for subsequent processing. Therefore, once selected, the working video is modified in accordance with the selected post processing operation at 1008.

The various aspects, embodiments, implementations or features of the described embodiments can be used separately or in any combination. Various aspects of the described embodiments can be implemented by software, hardware or a combination of hardware and software. The non-transitory computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

The embodiments were chosen and described in order to best explain the underlying principles and concepts and practical applications, to thereby enable others skilled in the art to best utilize the various embodiments with various modifications as are suited to the particular use contemplated. It is intended that the scope of the embodiments be defined by the following claims and their equivalents.

What is claimed is:

1. A method, comprising:
   providing an unprocessed digital video stream from a digital video source;
   directly presenting at least some of the unprocessed digital video stream in real time at a display;
   sensing a first gesture, the first gesture being associated with a first video process;
   sensing a second gesture in conjunction with the first gesture, the second gesture associated with a second video process;
   interpreting the first and the second gestures as a third gesture, the third gesture being associated with a third video process;
   modifying at least a portion of the unprocessed digital video stream presented at the display in real time in accordance with the third video process;
   storing at least the modified portion of the digital video stream in a memory device as modified digital video,
   wherein when the third video process is explicitly associating a first object image and a second object image in the unprocessed digital video stream,
   modifying only those portions of the unprocessed digital video stream that include the associated first and second object image; and
   when the third video process is implicitly associating the first object image and the second object image in the digital video stream,
   modifying only those portions of the unprocessed digital video stream that include the implicitly associated first and second object images.

2. The method as recited in claim 1, further comprising:
   storing metadata associated with the modified digital video.

3. The method as recited in claim 2, further comprising:
   processing a request to retrieve selected portions of the modified digital video.

4. The method as recited in claim 3, further comprising:
   presenting the retrieved portions of the modified digital video; and
   editing the retrieved portions of the modified digital video.

5. The method as recited in claim 1, wherein the gesture is sensed at the display.

6. The method as recited in claim 1, wherein the unprocessed digital video stream includes object information corresponding to an object image, the method further comprising:
   capturing the object information from the unprocessed digital video stream;
   generating a correlation value indicating a degree of correlation between the object image and an object profile in a database of stored object profiles using the object information;
   associating the object image with the stored object profile having the highest correlation value above a threshold correlation value;
   modifying the unprocessed digital video stream based on the associating.

7. The method as recited in claim 6, further comprising:
   if there is no correlation value greater than the threshold value, then capturing additional object information and repeating the using and associating.

8. The method as recited in claim 6, further comprising:
   identifying the object image based upon the correlation with the stored object profile.

9. The method as recited in claim 8, wherein when the object image is a human face, then the identifying is the identity of a human associated with the human face.

10. The method as recited in claim 6, further comprising:
    determining if there are at least two different object images represented by the captured object information;
    generating a correlation value between the at least two different object images;
    associating the two different object images when the correlation value is greater than a threshold correlation value; and
    modifying the video data based upon the associating of the two different object images.

11. The method as recited in claim 9, wherein if the at least two different object images are human faces, then determining an identity of at least one of the two human faces.

* * * * *

UNITED STATES PATENT AND TRADEMARK OFFICE
CERTIFICATE OF CORRECTION

PATENT NO. : 8,379,098 B2  Page 1 of 1
APPLICATION NO. : 12/764360
DATED : February 19, 2013
INVENTOR(S) : Rottler et al.

It is certified that error appears in the above-identified patent and that said Letters Patent is hereby corrected as shown below:

In the Specifications:

Column 2, line 45, delete "DUNPROCESSEDINGS" and insert -- DRAWINGS --.

Signed and Sealed this
Twenty-third Day of April, 2013

Teresa Stanek Rea
*Acting Director of the United States Patent and Trademark Office*